United States Patent
Marques et al.

(10) Patent No.: US 9,625,782 B2
(45) Date of Patent: Apr. 18, 2017

(54) ELECTROLYTE SOLUTION, PRINTING METHOD THEREOF AND RESULTING SOLID ELECTROLYTE

(71) Applicant: YD YNVISIBLE, S.A., Cartaxo (PT)

(72) Inventors: Ana Clara Lopes Marques, Moscavide (PT); Carlos Alberto Pinheiro Baptista, Freibrug (DE); Jorge Araujo, Barcelos (PT)

(73) Assignee: YD YNVISIBLE, S.A., Cartaxo (PT)

( * ) Notice: Subject to any disclaimer, the term of this patent is extended or adjusted under 35 U.S.C. 154(b) by 0 days.

(21) Appl. No.: 14/367,118

(22) PCT Filed: Dec. 21, 2012

(86) PCT No.: PCT/PT2012/000052
§ 371 (c)(1),
(2) Date: Jul. 15, 2014

(87) PCT Pub. No.: WO2013/095170
PCT Pub. Date: Jun. 27, 2013

(65) Prior Publication Data
US 2014/0361211 A1    Dec. 11, 2014

(30) Foreign Application Priority Data

Dec. 23, 2011 (PT) .................................. 106070

(51) Int. Cl.
| | | |
|---|---|---|
| *C09K 9/02* | (2006.01) | |
| *G02F 1/00* | (2006.01) | |
| *B41J 11/00* | (2006.01) | |
| *D06P 5/30* | (2006.01) | |
| *G02F 1/15* | (2006.01) | |
| *B41M 7/00* | (2006.01) | |

(52) U.S. Cl.
CPC ........... *G02F 1/1508* (2013.01); *B41J 11/002* (2013.01); *B41M 7/0081* (2013.01); *C09K 9/02* (2013.01); *D06P 5/30* (2013.01); *G02F 1/1525* (2013.01); *G02F 2001/1519* (2013.01)

(58) Field of Classification Search
CPC ................................. G02F 1/1519; G02F 1/15
See application file for complete search history.

(56) References Cited

U.S. PATENT DOCUMENTS

| | | | |
|---|---|---|---|
| 4,968,319 A | 11/1990 | Muller et al. | |
| 5,348,557 A | 9/1994 | von der Eltz et al. | |
| 5,859,722 A * | 1/1999 | Suga .................. | C07D 249/20 359/265 |
| 6,403,741 B1 | 6/2002 | Heuer et al. | |
| 7,301,687 B2 | 11/2007 | Berggren et al. | |
| 7,864,397 B2 * | 1/2011 | Wu ........................ | C09K 9/00 359/265 |
| 2002/0197535 A1 | 12/2002 | Dudley et al. | |

FOREIGN PATENT DOCUMENTS

| | | |
|---|---|---|
| AU | 2003212753 | 9/2003 |
| GB | 2396331 A2 | 6/2004 |
| JP | 1259328 A | 10/1989 |
| JP | 2280127 A | 11/1990 |
| WO | 9842796 A1 | 10/1998 |

OTHER PUBLICATIONS

Li-Ping Gao et al: "Preparation of UV curing crosslinked polyviologen film and its photochromic and electrochromic performances",Applied Surface Science, Elsevier, Amsterdam, NL,vol. 258, No. 3, Sep. 16, 2011, pp. 1184-1191.
T.H.J. Van Osch et al: "Inkjet Printing of Narrow Conductive Tracks on Untreated Polymeric Substrates", Advanced Materials, vol. 20, No. 2, Jan. 18, 2008, pp. 343-345.
Written Opinion of Corresponding PCT/PT2012/000052, dated Apr. 22, 2013.

* cited by examiner

*Primary Examiner* — Carol M Koslow
(74) *Attorney, Agent, or Firm* — Notaro, Michalos & Zaccaria P.C.

(57) ABSTRACT

The composition and method for depositing and processing a solid transparent electrolyte polymerized by ultraviolet (UV) radiation are described. The electrolyte composition includes, at least, an ionic compound, a polymerizable material, a photoinitiator and a polar solvent. The electrolyte is deposited by printing techniques, such as inkjet printing.

2 Claims, 4 Drawing Sheets

| $\Delta L^*$ † (a measure of contrast) | $\Delta A_{\lambda max(nm)}$ | Coloration efficiency ($C^{-1}$ cm$^2$) 97% |
|---|---|---|
| 31.6 | 0.82$_{625}$ | 614 |

† L* coordinate from L*a*b*:

$\Delta L^*$=L* (oxidized state)-L* (reduced state)

| Sample | $\Delta L^*;\Delta b^*$ 1st cycle | $\Delta L^*;\Delta b^*$ 30,000 cycles | $\Delta L^*;\Delta b^*$ 40,000 cycles | $\Delta L^*;\Delta b^*$ final | Total number of cycles | $\Delta L^*$ final/$\Delta L^*$ 1st cycle (%) |
|---|---|---|---|---|---|---|
| Device with UV cured electrolyte | 23.6 ; 24.3 | 21.1 ; 21.7 | 20.4 ; 20.9 | 19.8 ; 19.0 | 100,000 | 83.9 |
| Device with gel electrolyte | 33.1 ; 29.9 | 29.4 ; 29.4 | 29.4 ; 29.3 | 26.0 ; 26.8 | 100,000 | 78.5 |

Figure 5

ELECTROLYTE SOLUTION, PRINTING METHOD THEREOF AND RESULTING SOLID ELECTROLYTE

FIELD OF INVENTION

The present disclosure is in the general field of electrochemistry, and in particular in the field of electrolytes and their application in electrochromic devices.

BACKGROUND OF THE INVENTION

There is interest in the development of electrolytes that are solid and display high ionic conductivity, especially for application in flexible electrochemical devices.

There are known in literature reticulation agents which form polymeric films/membranes (polymerization) by action of several stimuli: light, electron beams, chemical agents, temperature.

One of the most common industrial polymerization processes is the irradiation of monomers, usually possessing acrylate groups, with ultraviolet (UV) radiation—photopolymerization.

Certain polyols, for instance trimethylolpropane, are typically used in the production of monomers with acrylate function. Even though these monomers are commercially accessible, there is no description in prior art for inkjet deposition of photopolymerizable formulations with the purpose of obtaining a solid electrolyte in electrochromic, and more generally, in electrochemical devices, such being the object of this invention.

Patent Documents

JP 1259328 "ELECTROLYTE OF ELECTROCHROMIC ELEMENT";
JP 2280127 "ORGANIC SOLID ELECTROLYTE AND ELECTROCHROMIC ELEMENT";
U.S. Pat. No. 6,403,741 "UV-stabilized electrochromic assembly based on poly(3,4-ethylenedioxythiophene) derivatives";
U.S. Pat. No. 5,348,557 "Production of dyeings by the inkjet printing technique on modified fiber materials using anionic textile dyes";
U.S. Pat. No. 7,301,687 "Electrochemical device";
AU 2003212753 "ELECTROCHEMICAL DEVICE";
are in the area of the present invention. However, none of them encompasses this invention.

BRIEF DESCRIPTION OF THE DRAWINGS

FIG. 5: table with the values of L*, a* and b* (1931 CIELAB system coordinates) which represent the maximum contrast obtained for an electrochromic device which contains an electrolyte embodying the present invention and a gel electrolyte, as well as the remaining contrast after 30,000, 40,000 and 100,000 color transition cycles (oxidation-reduction).

DETAILED DESCRIPTION OF THE INVENTION

Generalities

Figure 1:
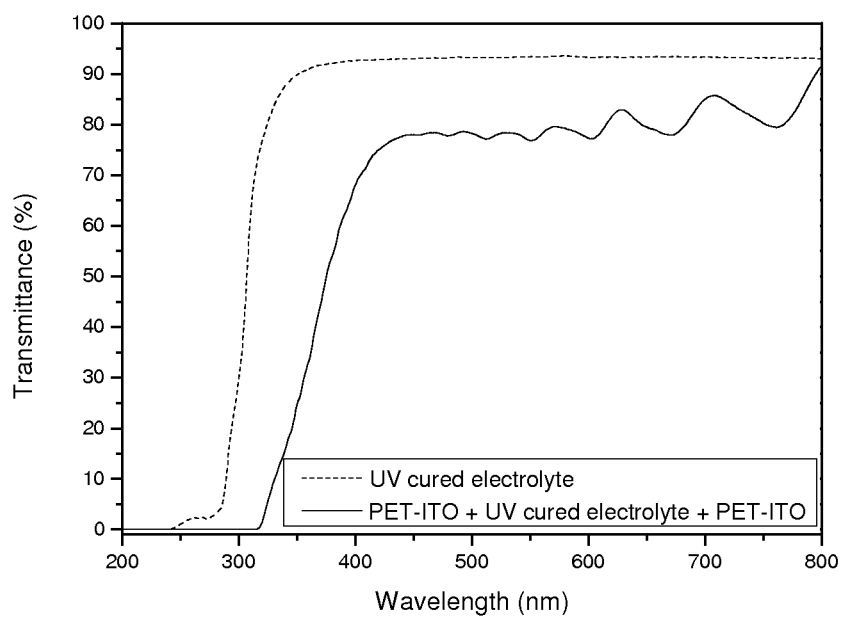
FIG. 1: transmittance graph for an electrolyte that embodies this invention.

In a photopolymerization process the energy provided to the reaction (ultraviolet radiation) is used in the cleavage of the photoinitiator with the formation of free radicals, responsible for the formation of monomeric radicals, thus capable of initiating the polymerization. In this kind of polymerization (radical polymerization) there is an active center in the extremity of the growing chain, and the monomers are added sequentially, one by one, with the propagation of the radical. The chain growth is extremely fast and, at a certain point, the propagation of the radical in the extremity of the chain halts and the growth ceases. The polymerization rate diminishes as the initiator and the monomer are consumed, and becomes null when either of them is totally consumed. To maximize the durability of electrochromic devices that integrate UV-radiation polymerizable electrolytes, it is important that the photoinitiator is depleneshed simultaneously with the monomer, to avoid the formation of free radicals and the presence of reactive organic groups in the electrolyte during the lifecycle of the device.

A typical electrochromic device consists of: two substrates, two layers (containing an electrically conductive material and an active electrochromic)—modified electrodes—spatially separated from one another and supported by the substrates, and an electrolyte (ionic conductor) positioned between the two layers. The application of potential to the electrodes varies the electrochromic oxidation state leading to a variation of its optical properties, i.e., its coloration state.

In this invention, a solution is deposited and exposed to ultraviolet (UV) radiation, forming a solid electrolyte.

This invention focus on the composition of the solution, its deposition method, and the characteristic features of the resulting electrolyte, as well as on the electrochemical systems that integrate said electrolyte.

Solution Composition

The present invention comprises solid polymeric electrolytes which result from the UV photopolymerization of a solution.

In the case of electrolytes integrated in electrochromic devices, the electrolyte layer can have an area restricted to the same area as the electrochromic material layer, so as to reduce the energy consumption and the production cost of the devices.

The electrolyte solution composition comprised in the present invention comprises ionic compounds, polymerizable monomers and/or oligomers, and/or polymers that have non-saturated sites, photoinitiators and solvents. Additionally, it can also comprise additives.

The solution includes ionic compounds responsible for the transport of ionic charges not limited to lithium, potassium and ammonium salts, such as lithium triflate ($LiCF_3SO_3$), lithium perchlorate ($LiClO_4$), lithium tetrafluoroborate ($LiBF_4$), lithium hexafluorophosphate ($LiPF_6$), potassium triflate ($KCF_3SO_3$), potassium tetrafluoroborate ($KBF_4$), potassium perchlorate ($KClO_4$), ammonium hexafluorophosphate ($NH_4PF_6$), ammonium tetrafluorophosphate ($NH_4PF_6$), and their mixtures.

The ionic compounds responsible for the ionic charge transport constitute between 0.1 to 7% w/w of the solution.

The polymerizable monomers and/or oligomers lead to the formation of a solid matrix after cure by exposition to UV radiation. Examples of polymerizable or cross-linkable, materials (including monomers, oligomers and polymers with non-saturated sites) are organic compounds based on acrylates, such as dipropylene glycol diacrylate (DPGDA), tripropylene glycol diacrylate, polypropylene glycol diacrylate (PPGDA), trimethylolpropane triacrylate (TMPTA), cyclic trimethylolpropane formal acrylate (CTFA), ethoxylated trimethylolpropane triacrylate (EO-TMPTA), propoxylated trimethylolpropane triacrylate (PO-TMPTA), pentaerythritol triacrylate (PETA), and mixtures thereof.

The polymerizable (or cross-linkable) compounds are used in the range of 20 to 35% w/w of the solution.

Polyether based polymers can also be used as reticulable materials, as long as they contain non-saturated sites to permit the cure, i.e., the formation of branched and interconnected polymeric structures.

In a preferred embodiment to this invention, polyethylene oxide-polypropylene oxide-allyl glycidyl ether (PEO-PPO-AGE) is used, with 60-97% molar EO, 0-10% molar PO and 3-30% molar AGE. This copolymer is known for stabilizing the cations generated by the salt dissociation (ionic compound) and for accelerating the salt dissociation, promoting a greater ionic conductivity; furthermore, it results in a solid polymerizable electrolyte with high flexibility.

These polymers are used in the range of 5 to 30% w/w.

Examples of photoinitiators used in the electrolyte formulation are 1-hydroxy-cyclohexyl-phenyl-ketone, phenylbis(2,4,6-trimethylbenzoyl)phosphine oxide, 2-hydroxy-2-methyl-1-phenyl propanone, 2-methyl-1-[4-(methylthio) phenyl]-2-morpholinopropan-1-one, 2,2dimethoxy-1,2-diphenylethane-1-one, and 2,4,6-trimethylbenzoyl diphenyl phosphine oxide.

The photoinitiators constitute the between 0.05% and 15% w/w of the solution.

The solution further includes polar solvents, not limited to alkylene carbonates (e.g. ethylene carbonate, propylene carbonate, butylene carbonate) and their mixtures, dimethyl carbonate, alkyl acetates (e.g., ethyl acetate), acetonitrile, tetrahydrofuran, 1,4-dioxane, and mixtures thereof.

The polar solvents constitute between 40 to 75% w/w of the solution.

To the polymerizable solution, there can be added additives, in particular titanium dioxide ($TiO_2$), which promotes the white color of the electrolyte, and can render it opaque.

In developing this invention, it was verified by laboratory experience that the optical memory of electrochromic cells functioning with the electrolyte described in the present invention to which $TiO_2$ was added is superior to the optical memory without the addition of titanium dioxide to the electrolyte.

Another alternative is the incorporation of electrochromic materials (e.g., based on thiophene, pyrrole, etc.) into the electrolyte formulation. In this way, electrochromic and electrolyte are indistinctly deposited in the same layer.

In a preferred embodiment of this disclosure, the solution has a viscosity between 10 and 20 centiPoise, which is suited to inkjet printing.

Deposition Method

The solution is printed by the method of inkjet printing, silkscreen (or screen printing) or other techniques, e.g., knife coating, filling of an electrochromic cell with the solution, deposition by dosing syringe, etc.

Inkjet printing was tested in a Dimatix Materials Printer DMP-2800 piezoelectric printer. With this printer, parameters can be changed as follows:
printhead electric potential;
number of segments of the potential function applied: time of each segment, value and transition between segments;
frequency of drop ejection;
printhead cleaning cycles;
printhead temperature; and
resolution of the printed patterns.

The most important parameters selected in printing the UV-cured electrolyte are nozzle electric potential, which can vary between 14 V and 40 V, and the optimum frequency for a good drop shape, which can vary between 2 kHz and 10 kHz. The temperature of the printing table (at which the substrate is placed) can vary between 20° C. and 60° C.

Several layers may be necessary to reach the desired electrolyte thickness when printing by inkjet. The deposition of each layer by inkjet can be alternated with UV-radiation exposure to promote a pre-polymerization of the deposited solution and, in such way, allowing for the stacking of the layers with a substantial increase of the polymeric film thickness. The resulting film is exposed to UV radiation to obtain the complete curing the material.

The prints are done in several layers (from 1 up to 25, or more) according to the intended printed film thickness. Polymeric polymerization, between each layer, by exposition to UV radiation, occurs for periods from 1 second to 5 minutes, according to the chemical composition of the electrolyte formulation, the power of the UV lamp and the distance between lamp and sample. Exposure to UV radiation alternating with deposition of the several layers results in a gradual polymerization along the film thickness.

The UV-radiation exposure times for polymerization run typically from 1 s to 5 min. The power of the lamp used for developing this invention was 250 Watt or 20-30 Watt/$cm^2$, but can vary.

The distance to the lamp varied between 5 cm and 20 cm, but can be other depending on the lamp power, and electrolyte thickness and formulation.

The electrolyte curing takes place in closed or open cell system, according to the assembly method of each particular device.

The electrolyte deposition by inkjet has the advantage of controlling and limiting the borders of the electrolyte film, more specifically of allowing the printing of features, drawings or patterns, which coincide, for example, with the printed pattern of electrochromic material. This way, in the electrochromic process the active electrolyte is restricted to the electrochromic area, allowing for a lower energy consumption of the device, as well as a lower quantity of employed electrolyte and, consequently, reduced fabrication cost devices.

Electrolyte Characteristics

The electrolyte comprised in this invention is flexible, transparent, (>90% transmittance in the visible region of the spectrum, cf FIG. 1), displays good adherence to the electrode, and good durability under extreme conditions in terms of temperature level, pressure, compression, humidity and solar radiation, without any observed degradation when inserted in an electrochromic device.

In a preferred embodiment of this invention, the electrolyte is exposed to the following conditions, separately, for 24 hours:
60° C.;
−18° C.;

1.3 Kg/cm²; and
0.8 bar;
without observing any degradation in the performance of the electrochromic device which integrates the electrolyte.

The electrolyte displays high ionic conductivity, leading to a good performance of the electrochromic device in terms of transition times (oxidation and reduction), contrast, optical memory, coloration efficiency and electrochemical stability (functioning for a high number of cycles); in an embodiment to this invention a contrast retention level was achieved that was superior to 80% after 100,000 activation (oxidation-reduction) cycles.

Additionally:
- does not flow under gravity when the device is placed vertically;
- does not display bubbles;
- does not display color alteration (e.g., yellowing) with the frequent use of the devices;
- is durable in extreme conditions of temperature, humidity, pressure, compression and solar radiation;
- is transparent;
- is handleable;
- is flexible;
- reduces the need for device sealing;
- in case of user opening it does not spill, limiting any spill-related damage.

Figures 2, 3:
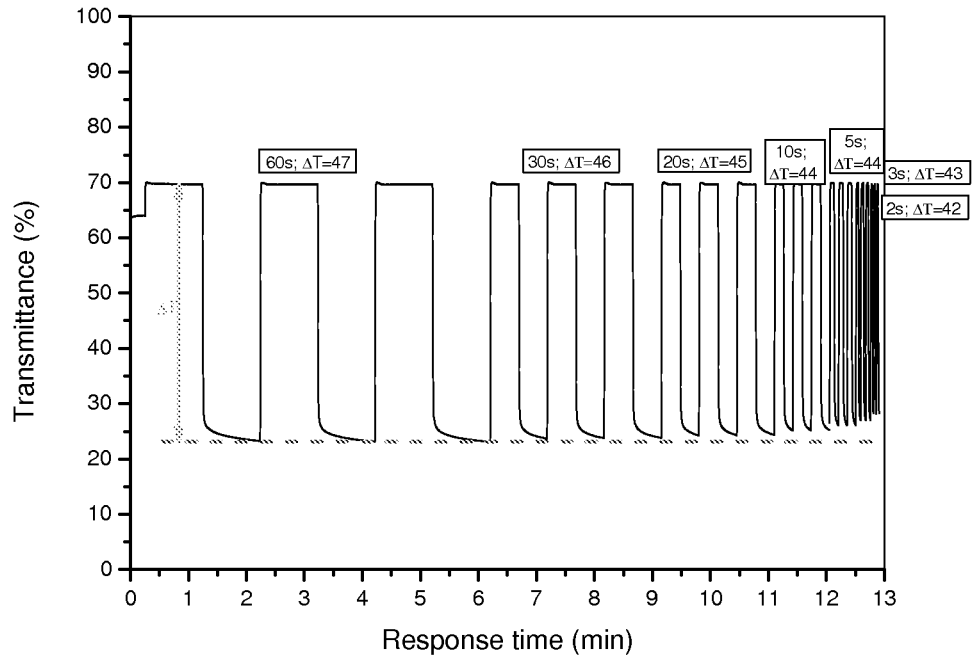
FIG. 2: graph of the response time for a device which integrates an electrolyte that embodies this invention.
FIG. 3: table with the coloring value (contrast using the L* (Lightness) coordinate of the 1931 CIELAB color system), absorbance at the maximum wavelength and coloration efficiency for an electrochromic device with an electrolyte that embodies this invention.

FIG. 2 represents the evolution of transmittance in an electrochromic device that integrates an electrolyte comprised in this invention, upon application of an electrical potential using a square wave program with an amplitude of −1.5 V to 1.5 V (taking 0 V as reference value) and with growing frequencies with pulse duration times of 60 s, 30 s, 20 s, 10 s, 5 s, 3 s and 2 s.

No significant variation of visual contrast is observed from the electrochromic devices in the different situations described in FIG. 2.

The electrolyte presents a high ionic conductivity (superior to $10^{-2}$ S/cm²), promoting good performance of the electrochromic device, in terms of transition times (oxidation and reduction), generally below 1 second.

FIG. 3 refers to 5×5 cm devices, prepared with PEDOT deposited by inkjet, with an electrolyte comprised in this invention.

The optical memory is related to color retention in open circuit. Color retention, i.e. percentual absorbance is graphically represented over time in FIGS. 4a and 4b (discoloration evolution over time in open circuit). The color retention was calculated in the following way: absorbance at a certain time (in open circuit)×100/initial absorbance, i.e., maximum absorbance reached by in the reduced, or colored, state.

Figure 4A:
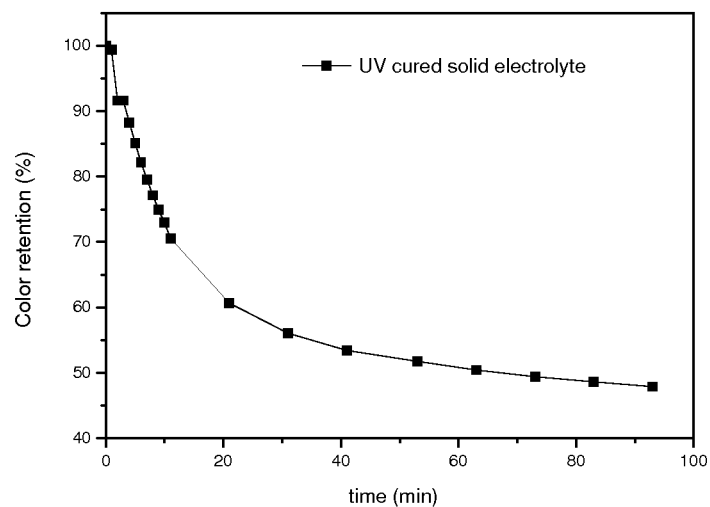
FIGS. 4a and 4b: graphs of the optical memory time for an electrochromic device that contains an electrolyte which embodies this invention, and a gel electrolyte, respectively.
Figure 4B:
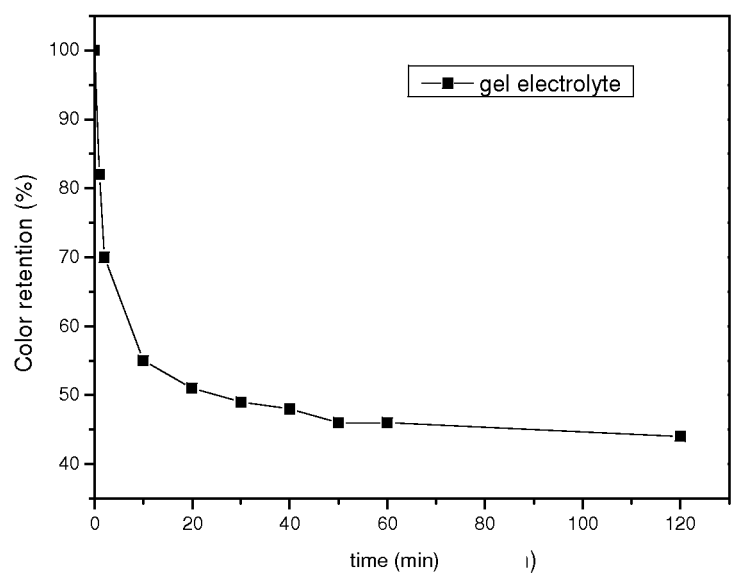

By analyzing the graphs in FIGS. 4a and 4b it can be verified that the device with an electrolyte comprised in this invention displays greater memory effect than a device prepared with gel electrolyte. For example, it still displays a color retention of 80% after 7 minutes in open circuit, while the gel-electrolyte device displays the same retention after just 1 min.

FIG. 5 shows the greater durability of an electrolyte comprised in this invention versus an electrolyte in gel form: 84% of color/contrast retention versus 78.5% after 100,000 activation cycles (reduction-oxidation).

EXEMPLARY EMBODIMENTS

The present invention can be embodied in any electrochemical architecture in which the electrolyte is a separate layer from the remaining functional components; in an electrochromic architecture embodiment the electrolyte and the electrochromic can be an homogenous layer.

By way of illustration, electrochromic devices and architectures for magazines, commercial panels, shop windows, monitors, packages, tickets, and postal cards, personal or commercial, simple and tactile stickers, are implementations of this invention made possible by the fact of the electrolyte of this invention not flowing under gravity, and leading to a good electrochromic performance, as well as exhibiting electrochemical stability and durability. Their fabrication method is made possible by the fact that the electrolyte of this invention is a liquid solution that can easily be deposited by several techniques, including inkjet printing, and solidifies (polymerizes) in the desirable shape under action of UV radiation.

The examples and materials described in this invention are presented as non-limitative illustrations.

Other embodiments may occur to experts in the state of the art which, while departing in detail from these examples and materials, do not depart from the scope of this invention.

The invention claimed is:

1. Electrolyte solution, characterized by integrating:
   ionic compounds between 0.1 and 7% w/w, selected from the group consisting of lithium perchlorate, lithium triflate, lithium tetrafluoroborate and lithium hexafluorophosphate;
   monomers, oligomers or polymers with non-saturated sites, between 20 and 35% w/w, selected from the group consisting of poly(propylene glycol) diacrylate (PPGDA), trimethylolpropane triacrylate (TMPTA), and cyclic trimethylolpropane formal acrylate (CTFA);
   photoinitiators between 0.05% and 15% w/w selected from the group consisting of phenylbis(2,4,6-trimethylbenzoyl)phosphine oxide, 1-hydroxy-cyclohexyl-phenyl-ketone, and 2-hydroxy-2-methyl-1-phenyl propanone; and
   polar solvents between 40 and 75% w/w, selected from the group consisting of ethylene carbonate, propylene carbonate, dimethyl carbonate and acetonitrile,
   characterized by having a viscosity between 10 and 20 centiPoise.

2. Electrolyte solution, characterized by integrating:
   ionic compounds between 0.1 and 7% w/w, selected from the group consisting of lithium perchlorate, lithium triflate, lithium tetrafluoroborate and lithium hexafluorophosphate;
   monomers, oligomers or polymers with non-saturated sites, between 20 and 35% w/w, selected from the group consisting of poly(propylene glycol) diacrylate (PPGDA), trimethylolpropane triacrylate (TMPTA), and cyclic trimethylolpropane formal acrylate (CTFA);
   photoinitiators between 0.05% and 15% w/w selected from the group consisting of phenylbis(2,4,6-trimethylbenzoyl)phosphine oxide, 1-hydroxy-cyclohexyl-phenyl-ketone, and 2-hydroxy-2-methyl-1-phenyl propanone; and
   polar solvents between 40 and 75% w/w, selected from the group consisting of ethylene carbonate, propylene carbonate, dimethyl carbonate and acetonitrile,
   characterized in that it additionally integrates electrochromic materials.

* * * * *